United States Patent
Schabenberger et al.

(10) Patent No.: US 10,336,291 B2
(45) Date of Patent: Jul. 2, 2019

(54) MOTOR VEHICLE COMPRISING A FRONT GATE WHICH IS ARRANGED PIVOTABLY ON A BODY VIA TWO HINGE JOINTS

(71) Applicant: Audi AG, Ingolstadt (DE)

(72) Inventors: Richard Schabenberger, Münchsmünster (DE); Norman Dix, Ingolstadt (DE)

(73) Assignee: Audi AG, Ingolstadt (DE)

( * ) Notice: Subject to any disclaimer, the term of this patent is extended or adjusted under 35 U.S.C. 154(b) by 64 days.

(21) Appl. No.: 15/523,156

(22) PCT Filed: Jul. 31, 2015

(86) PCT No.: PCT/EP2015/001584
§ 371 (c)(1),
(2) Date: Apr. 28, 2017

(87) PCT Pub. No.: WO2016/066234
PCT Pub. Date: May 6, 2016

(65) Prior Publication Data
US 2017/0327074 A1    Nov. 16, 2017

(30) Foreign Application Priority Data
Oct. 29, 2014    (DE) .......................... 10 2014 015 998

(51) Int. Cl.
*B60R 21/38* (2011.01)
*B62D 25/12* (2006.01)
*E05D 3/14* (2006.01)

(52) U.S. Cl.
CPC .............. *B60R 21/38* (2013.01); *B62D 25/12* (2013.01); *E05D 3/145* (2013.01)

(58) Field of Classification Search
CPC .......... B60R 21/38; B62D 25/12; E05D 3/145
See application file for complete search history.

(56) References Cited

U.S. PATENT DOCUMENTS

| 7,896,122 B2* | 3/2011 | Borg ...................... B62D 25/12 180/274 |
| 9,308,885 B2 | 4/2016 | Schabenberger et al. |

(Continued)

FOREIGN PATENT DOCUMENTS

| DE | 101 11 146 | 3/2002 |
| DE | 100 55 828 | 5/2002 |

(Continued)

OTHER PUBLICATIONS

International Search Report issued by the European Patent Office in International Application PCT/EP2015/001584 dated Nov. 11, 2015.

(Continued)

*Primary Examiner* — Karen Beck
(74) *Attorney, Agent, or Firm* — Henry M. Feiereisen LLC

(57) ABSTRACT

A motor vehicle includes two hinge joints to swingably connect a front gate to the vehicle body. Each hinge joint includes a body-side hinge lower part and a gate-side hinge upper part that includes an upper part portion swingably arranged on another upper part portion, with the upper part portions being detachably secured by a locking member. Pivot struts swingably connect the hinge lower and upper parts to one another, with one pivot strut including a strut portion arranged on an upper part portion and movable translatorily in relation to another strut portion. To raise the front gate for protection, an actuator is activated to thereby release the locking member and pivot one upper part portion relative to the other one upper part portion, thereby translatorily moving one strut portion relative to the other strut portion, and with the one upper part portion pivoting relative to the other pivot strut.

14 Claims, 3 Drawing Sheets

(56) References Cited

U.S. PATENT DOCUMENTS

| | | | |
|---|---|---|---|
| 9,764,711 B2* | 9/2017 | Narita | B62D 25/10 |
| 2006/0012160 A1* | 1/2006 | Johansson | B60R 21/231 |
| | | | 280/743.1 |
| 2007/0080010 A1* | 4/2007 | Gust | B60R 21/38 |
| | | | 180/69.2 |
| 2009/0140509 A1* | 6/2009 | Johansson | B60R 21/231 |
| | | | 280/730.1 |
| 2015/0060180 A1* | 3/2015 | Yang | B60R 21/38 |
| | | | 180/274 |
| 2016/0339963 A1* | 11/2016 | Inoue | B62D 25/12 |
| 2017/0136985 A1* | 5/2017 | Narita | B62D 25/10 |
| 2017/0259776 A1* | 9/2017 | McLundie | B60R 21/38 |
| 2018/0022311 A1* | 1/2018 | Czechtizky | B60R 21/38 |
| | | | 16/231 |

FOREIGN PATENT DOCUMENTS

| | | | | |
|---|---|---|---|---|
| DE | 202004002480 U1 | 5/2004 | | |
| DE | 103 43 882 | 5/2005 | | |
| DE | 102004007858 | 5/2005 | | |
| DE | 102005022924 | 11/2006 | | |
| DE | 102008050678 | 4/2010 | | |
| DE | 102008058186 A1 | 5/2010 | | |
| DE | 102011004225 A1 * | 8/2012 | | B60R 21/34 |
| DE | 202015006895 U1 * | 11/2015 | | B60R 21/38 |
| EP | 2364887 A1 * | 9/2011 | | B60R 21/38 |
| KR | 20120133833 A | 12/2012 | | |
| WO | WO-2016162317 A1 * | 10/2016 | | B60R 21/38 |
| WO | WO-2017148495 A1 * | 9/2017 | | B60R 21/38 |

OTHER PUBLICATIONS

Chinese Search Report dated Aug. 29, 2018 with respect to counterpart Chinese patent application 201580058867.5.

Translation of Chinese Search Report dated Aug. 29, 2018 with respect to counterpart Chinese patent application 201580058867.5.

* cited by examiner

MOTOR VEHICLE COMPRISING A FRONT GATE WHICH IS ARRANGED PIVOTABLY ON A BODY VIA TWO HINGE JOINTS

CROSS-REFERENCES TO RELATED APPLICATIONS

This application is the U.S. National Stage of International Application No. PCT/EP2015/001584, filed Jul. 31, 2015, which designated the United States and has been published as International Publication No. WO 2016/066234 and which claims the priority of German Patent Application, Serial No. 10 2014 015 998.1, filed Oct. 29, 2014, pursuant to 35 U.S.C. 119(a)-(d).

BACKGROUND OF THE INVENTION

Modern motor vehicles sometimes have protective systems which, in the event of a collision, are intended to protect the collision object, when a person is involved, from serious injuries. Such a protection system is the so-called "pedestrian protection". This protective system has the effect that a front gate, i.e. the engine hood, which is arranged pivotably on the body via two hinge joints, can be raised, i.e. lifted, with the gate end adjacent to the windscreen in opposition to the normal opening swing direction. This raising of the front gate, which is raised by only a few centimeters, creates more clearance and thus space to components located below the front gate, in particular the engine, so that the risk of injury to the person can be reduced in the event of a collision.

DE 10 2005 022 924 A1 discloses a motor vehicle with a front gate, which is arranged pivotably on a body via two hinge joints. Such a hinge has a first hinge limb with a first fastening portion for fastening to the front gate and a second hinge limb with a second fastening portion for fastening to the body, with the two hinge limbs each having articulated sections which are articulated to one another in such a way that the hinge limbs are swingable from a first angular position of the articulated section commensurate with a closed position into a second angular position commensurate with an opening position of the front gate. The angle between the articulation sections changes hereby steadily in one direction. Furthermore, a lifting device is provided which when actuated in the closed position of the front gate distances the first fastening portion from the second fastening portion such that the front gate is raised. The angle during this lifting operation changes in the same direction.

DE 103 43 882 A1 discloses a front gate arrangement on a motor vehicle, with at least one hinge device in the form of a four-bar joint located at the rear in the direction of travel, and including a long arm and a short arm, with the hinge device enabling the front gate to be pivoted for normal opening and closing, and to be raised at the rear region in the event of a collision of the vehicle. To this end, the hinge devices include an energy accumulator that actuates a displacement device in the event of a collision of the vehicle, which displacement device, in turn, acting directly on the front gate and being detachably connected to the same. The joint of the four-bar joint on the side of the front gate is hereby fixed in an articulated manner to a pivoting lever which is detachably fixed to the front gate with one end in the idle state, and pivotable in relation to the front gate with the other end thereof about a rotary articulation arranged on the front gate in the region of the articulation of the displacement device. In a collision of the vehicle, the displacement device raises the front gate in relation to the idle state in such a way that it is guided by the arms of the four-bar joint and by the pivoting lever detaching itself on one side from the front gate.

DE 10 2004 007 858 A1 describes a front gate arrangement on a vehicle, including at least one hinge device in the form of a four-bar joint, via which the front gate can be pivoted during normal opening and closing and can be raised in the rear region in a collision of the vehicle. Such a hinge device has a spring element which in a collision of the vehicle actuates an adjusting lever which, in turn, acts directly on the front gate and bears against the latter directly or via intermediate elements. The front-gate-side joints of the four-bar joint are articulated to a pivoting lever which, in the idle state, is releasably attached to the front gate with one end and can be pivoted relative to the front gate about a swivel joint, arranged in the region of the attachment of the adjusting lever to the front gate. In the event of a collision, the adjusting lever lifts the front gate, guided by the arms of the four-bar joint and the pivot lever detaching on one side from the front gate, in relation to the idle state.

DE 100 55 828 A1 discloses a hinge device for a motor vehicle for articulating a front hood of a motor vehicle in combination with a safety device for displacing the front hood to a raised position. The hinge device has a multi-joint hinge, by which the front hood can be opened from the front of the vehicle. The safety device has at least one actuator which can be actuated via the signals of a sensor system and by which the front hood can be displaced from its closed initial position to a position in which the front hood is raised at least in the region of the front hood. For the safety-related raising of the front hood, the interaction of the hinge device between the front hood and the body can be deactivated or interrupted.

Finally, DE 101 11 146 A1 discloses a pivotable gate of a motor vehicle, having a lock which has a gate-side first lock member and a body-side second lock member, and a hinge which has a gate-side first hinge member and a body-side second hinge member. After opening the lock, with the two lock member being separated from one another, the gate can be swung open and can be catapulted in a release-controlled manner into a gap clearance position with respect to the body in a closed state, in which the two lock members are bound together. For this purpose, the gate is brought into the gap clearance position by the force of at least one force accumulator liberated during release.

SUMMARY OF THE INVENTION

The invention is based on the problem to provide a motor vehicle or a front gate arrangement that is compact in design and allows a reliable movement of the front gate both to the normal opening position and to the raised protective position.

This problem is solved in accordance with the invention for a motor vehicle of the type mentioned at the outset by providing each hinge joint with a body-side arranged hinge lower part and a gate-side arranged hinge upper part, which are connected to one another via first and second pivot struts swingably arranged thereon, with the hinge upper part including a first gate-side mounted upper part portion and a second upper part portion which is swingably arranged on the first upper part portion and detachably secured via a locking means and to which both pivot struts are swingably arranged, and with the first pivot strut including a first strut portion arranged on the hinge lower part and a second strut portion which is arranged on the second upper part portion and movable translatorily in relation to the first strut portion, and with a controllable actuator being provided which is coupled or can be coupled to the second upper part portion to raise the front gate to a protective position, during which raising movement the locking means is released and the second upper part portion is pivoted about its pivotal connection relative to the first upper part portion accompanied by a simultaneous translatory movement of the second strut portion relative to the first strut portion, and is pivoted about its pivotal connection relative to the second pivot strut.

Each hinge joint, via which the front gate, configured in particular as "embracing" front gate which laterally slightly embraces the body, is supported, includes in accordance with the invention, a hinge lower part, which is fastened on the body side, normally bolted together, and a hinge upper part, which is fastened on the gate side. Hinge upper part and hinge lower part are connected to one another by a "subassembly" comprised of two pivot struts which are swingably arranged to the upper part and to the lower part. In principle, the hinge joints are still designed as four-bar joints, but, as will be described hereinafter, with specific configurations of the hinge upper part and one of the pivot struts.

The hinge upper part is made of two parts. It includes a first upper part portion and a second upper part portion. The first upper part portion is fastened on the gate side. The second upper part portion is swingably arranged on the first upper part portion, preferably on the end side. In the basic position, when the gate is closed and should be opened only for service purposes, both upper parts are fixed to one another by a locking means which, however, can be released, thus forming virtually a rigid unit.

The two pivot struts are swingably arranged on the second upper part portion and are swingably attached at the other end to the hinge lower part. When the front gate is now swung open in a normal manner, the hinge upper part pivots upwards with both upper part portions which are locked together, accompanied at the same time by a pivoting of the pivot struts about their respective points of articulation on the hinge upper part and on the hinge lower part.

Conversely, when the protective system is activated, i.e. the front gate is to be raised for pedestrian protection, the actuator is activated through appropriate control via an associated control unit. The actuator is coupled or can be coupled to the second upper part portion, thereby acting upon the second upper portion. At the other end, the actuator is fixed in position. When activated, a high pressure is applied to the second upper part portion via the actuator for raising the front gate, accompanied by a release of the locking means fixes the first and second upper part portions with one another, so that the second upper part portion can pivot relative to the first upper part portion. As this pivoting is accompanied by a positional displacement of the pivot axis, with which the first pivot strut is fastened to the second upper part portion, the first pivot strut is configured in accordance with the invention of two parts. It includes a first strut portion arranged on the hinge lower part and a second strut portion arranged on the second upper part portion. The second strut portion can move translatorily relative to the first strut portion, i.e. the length of the first pivot strut is ultimately variable. When the front gate is now raised through activation of the actuator and release of the locking means, the second upper part portion is caused to undergo a pivotal movement and rotates about its articulation on the first upper part portion and its articulation on the second pivot strut. At the same time, the first pivot strut is lengthened by translatory movement of the second strut portion, up to a maximum extended position, which is reached when the raised position is reached.

By mounting the front gate via two such hinge joints according to the invention, an active pedestrian protection can thus be achieved, in particular also in the case of "encompassing" front gates which require a particular movement mechanism to avoid a collision with the body when normally swung open, with the front gate being able to move to a defined end position at the same time. The front gate can easily be moved back to the closed position after it has been raised by pushing it down. This requires application of little force only in opposition to the actuated elements of the joint mechanism, i.e. as the front gate is pushed, the extended first pivot strut is pushed back into its initial position, thereby also causing the two upper part portions to be moved back to their basic position. Depending on the configuration of the locking means, still to be discussed in more detail hereinafter, the locking means is able to again effect the locking of the upper part portions in the pushed-back end position. Depending on the configuration of the actuator, it is also possible to optionally work against the actuator, which again is possible with little force application.

According to a refinement of the invention, the second strut portion can be moved along a straight path or along a curved path in relation to the first strut portion, depending on how the movement mechanism is actually realized.

Suitably, one of the two strut portions is formed with an oblong hole for engagement of a guide pin provided on the other strut portion. Thus, a slotted guide is realized that enables a reliable guidance of both strut portions relative to one another. In the closed position, the guide pin can be received in a latching receptacle of the oblong hole formed by way of a constriction, thereby establishing an additional locking of the lifting mechanism. Furthermore, a certain system damping can be achieved through corresponding geometric configuration of the oblong hole, which, for example, can vary slightly in its width, by allowing the guide pin to move, after activation of the actuator, in the oblong hole optionally against a certain resistance defined by the width of the oblong hole.

As an alternative to the configuration of a slotted guide with oblong hole and guide pins, it is conceivable to form on a strut portion lateral guide tabs which laterally embrace the other strut portion. Also in this way, a simple and reliable linear guide can be realized.

Suitably, provision is made in addition for a holding device by which the first pivot strut is secured against pivoting relative to the hinge lower part after movement of the second strut portion. Such a holding device prevents an inadvertent opening of the gate, when the lifting process is initiated. Therefore, the gate cannot be opened so long as it is raised for pedestrian protection.

The holding device can hereby include a lug-like or projection-like retaining portion, provided on the second strut portion, and a retaining receptacle provided on the hinge lower part, with the retaining portion engaging behind or engaging in the retaining receptacle, when reaching the end position. As an alternative, the holding device can also include a hook or a hook receptacle, with the hook engaging on the hook receptacle when reaching the end position. Both configurations allow a reliable joint fixation. The holding device is provided to prevent the four-bar joint to inadvertently open and creation of an undefined movement. Also, the gate may no longer be opened by the user.

The locking means, by which the two upper part portions are locked together in their basic position, is automatically released according to an advantageous refinement of the invention when the actuator is actuated, and is configured e.g. in the form of a locking hook. The locking hook is arranged on one upper part portion and engages in a corresponding hook portion on the other upper part portion. The locking hook is preferably located on the second upper part portion whereas the hook portion is provided on the first upper part portion. In the locking position, the locking hook engages behind the hook portion. The actuator is preferably coupled to the locking hook, so that the locking hook is automatically released, in particular swings out, from its locked engagement, when the actuator is activated. This means that the locking hook is preferably swingably arranged on the second upper part portion and preferably coupled to a spring element which automatically pulls it into the locking position. When the actuator is now activated, the locking hook is drawn from its locking position in opposition to the restoring force of the spring element, thereby releasing the locking and allowing the two upper part portions to move inwards relative to one another.

As an alternative to the use of a locking hook, it is also conceivable to provide the locking means in the form of a bolt or rivet that can shear off. For example, provided on an upper part portion is a bolt which is inserted into a corresponding bolt receptacle and engages a corresponding recess on the other upper part portion. When the actuator is activated to thereby cause a great force to be applied upon the second upper part portion, the bolt is sheared off, thus breaks, thereby liberating the locking mechanism and allowing the upper part portions to move inwards relative to one another. There is no need to permanently couple the actuator to the second upper part portion, but the actuator may run at high force against it after its activation. In this configuration of the locking means, a renewed locking of the two upper part portions is no longer possible after the front gate has been manually pushed down to the original closed position, whereas a configuration of the locking means with preferably pivotable locking hook allows renewed locking.

The actuator itself is preferably a pyrotechnical linear actuator. This means that the actuator ignites after receiving a corresponding ignition signal and executes a linear adjusting movement so as to realize a translatory movement path and activation path, along which the adjusting movement is established. Since such a pyrotechnical linear actuator can only be actuated once, thus no stored energy is contained and no restoring force is generated during return movement, the front gate can be pushed back to the closed position again, as described, with little force after being raised.

The actuator itself, i.e. In particular the pyrotechnical linear actuator, is coupled, as described, at one end to the second upper part portion. The other end is fixed in position during the lifting movement. It can be arranged on the body, alternatively also on the hinge lower part. It is also conceivable to arrange the other end of the actuator on the first strut portion. While being lifted, the first strut portion remains fixed in position, so that the actuator is adequately supported. However, when the front gate is swung open in the usual manner for service purposes, the actuator ultimately moves with the first pivot strut, thus also pivots.

BRIEF DESCRIPTION OF THE DRAWING

Further advantages, features and details of the invention become apparent from the exemplary embodiment described in the following and from the drawing. It is shown in.

DETAILED DESCRIPTION OF PREFERRED EMBODIMENTS

Figure 1:
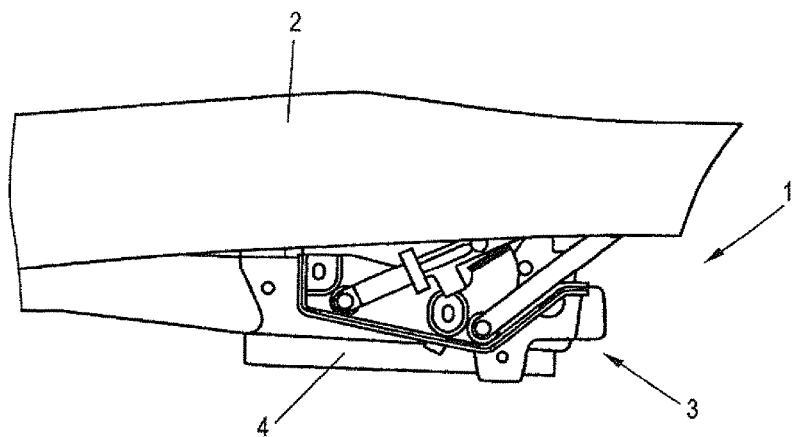
FIG. 1 a partial view of a motor vehicle according to the invention with partial view of the front gate and a hinge joint in the closed state, FIG. 2 the hinge joint of FIG. 1 on an enlarged scale, FIG. 3 a partial view corresponding to FIG. 1 with the front gate raised to the protective position, FIG. 4 the hinge joint of FIG. 3, FIG. 5 the arrangement of FIG. 1 in the normal open-swung position, and FIG. 6 the hinge joint of FIG. 5.

FIG. 1 shows a partial view of a motor vehicle 1 according to the invention, with part of the front gate 2 being illustrated here, as well as a hinge joint 3, which is mounted on a body, not shown in greater detail. The hinge joint 3 includes, see for this purpose also FIG. 2, a hinge lower part 4 which is to be fastened on the body side and to which a first pivot strut 5 and a second pivot strut 6 are mounted in corresponding pivot bearings 7, 8. The two pivot struts 5, 6 connect the hinge lower part 4 with a hinge upper part 9. The hinge upper part 9 includes a first upper part portion 10 and a second upper part portion 11. The two pivot struts 5, 6 are pivotally mounted on the second upper part portion 11 via corresponding pivot bearings 12, 13. The two upper part portions 10, 11, in turn, are connected to one another via a pivot bearing 23, i.e. they can pivot relative to one another. In the position shown in FIGS. 1 and 2, the two hinge upper parts 10, 11 are firmly, but detachably, connected to each other by a locking means. This locking means can, for example, include a bolt which is provided on the second upper part portion 11 and can be sheared off and which engages in a bolt receptacle 14, see FIG. 4, in the closed position. The bolt is sheared off, when the front gate is raised in a manner still to be discussed hereinafter. As an alternative to the bolt locking mechanism, it is also conceivable to attach a locking hook that is swingably mounted on the second upper part portion 11 and engages behind a hook portion on the first hinge upper part 10. During lifting, this hooked lock is released by pivoting the locking hook in opposition to the restoring force of a spring or the like from the locking position, which can be implemented by an actuator still to be described hereinafter.

Figure 4:
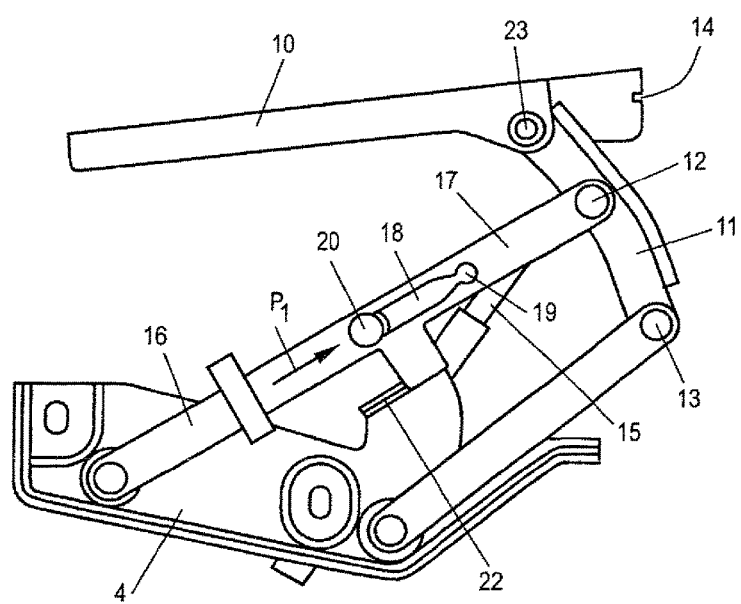

Furthermore, see FIG. 4, provision is made for a controllable actuator 15, in particular in the form of a pyrotechnical linear actuator. In the embodiment described here, the positioning element is fastened to one end, here the lower end, on the hinge lower part or body-fixed. The other end of the adjusting element 15 is arranged adjacent to the second hinge upper part 11, preferably in a region close to the hinge joint 23, but is not fixedly connected to the second hinge upper part 11.

Furthermore, the hinge joint 3 is characterized in that the first pivot strut 5 includes a first strut portion 16 which is fixedly connected to the hinge lower part via the hinge joint, and a second strut portion 17 which is connected to the second upper part portion 11 via the hinge joint 12. The hinge portion 17 is translatorily movable relative to the first hinge portion 16, i.e. the pivot strut 5 can change its length. For this purpose, see FIG. 4, an oblong hole 18 is formed on the second strut portion 17 and has a locking receptacle 19 on its one end. A guide pin 20 is formed on the first strut portion 16 which engages in the oblong hole 18 and is received in the closed position, shown in FIG. 2, in the locking receptacle 19 which is formed by a corresponding constriction.

Figure 2:
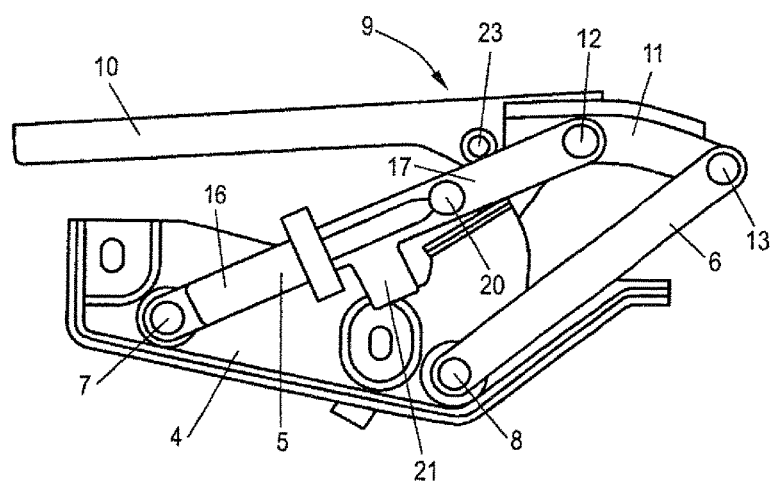

In the closed position, see FIG. 2, the two upper part portions 10 and 11 are locked together, an elongated hinge upper part 9 being formed. The two pivot struts 5, 6 lie approximately parallel to one another, in any case are swung inwards. In particular, the first pivot strut 5 is pushed together, the guide pin 20 is received in the locking receptacle 19.

Figure 3:
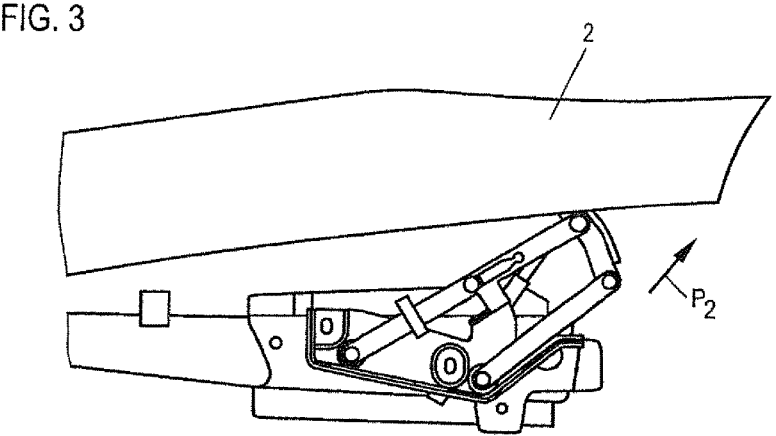

When the pedestrian protection is activated in response to a sensed impact, a control signal is sent to the actuator 15 via a control device, which is not shown in detail, i.e. the pyrotechnic linear actuator is ignited. Since being supported on the body side via the hinge lower part 4, the actuator presses against the second upper part portion 11 at high force. Due to this high force, the locking means in the form of the bolt, not shown in detail, is sheared off and engages the bolt receptacle 14 on the first upper part portion 10. As a result of this shearing off, the second upper part portion 11 is effectively liberated, is able to pivot relative to the first upper part portion 10 and move inwards, as shown in FIG. 4. As a result of the extension of the actuator 15 and the movement of the first upper part portion 10, the second strut portion 17 inevitably undergoes a translatory movement relative to the first strut portion 16, with this translatory movement being guided by the slotted guide via the oblong hole 18 and the guide pin 20. The first pivot strut 5 is clearly extended. Therefore, and by the circumstance that the second hinge upper part 11 also pivots about the hinge joint 13, the front gate 2 is raised slantingly towards the upper right, as indicated by arrow P2. The extension of the first pivot strut 5 is shown by arrow P1. The hinge joint 13 moves upwards, with it also the front gate 2, as is apparent from FIGS. 3 and 4.

When, as an alternative to the locking means comprised of the bolt and the bolt receptacle 14, provision is made for a pivotable locking hook, the actuator 15 would act directly on the pivotable locking hook. As the actuator 15 extends, the locking hook would automatically be pivoted and move out of its locked engagement. This would result in the same lifting movement. The advantage of this hook solution is that, once the front gate 2 has been pushed down to the closed position according to FIGS. 1 and 2, the two upper part portions 10 and 11 can be locked again, i.e. the locking hook can again snap into the locking section. This is no longer possible with the sheared-off bolt.

A tab-like retaining portion 21 is formed on the second strut section 17 and engages during raising movement behind a retaining receptacle 22, here also in the form of a tab, on the hinge lower portion 4. This eliminates the possibility that an inadvertent movement triggers the opening kinematics during the activation process, i.e. the front gate 2 is ultimately locked against normal pivoting.

Figure 5:
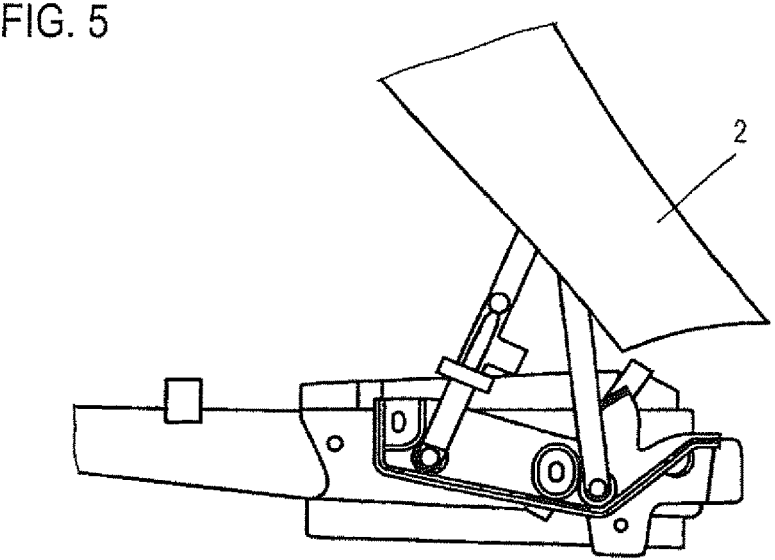
Figure 6:
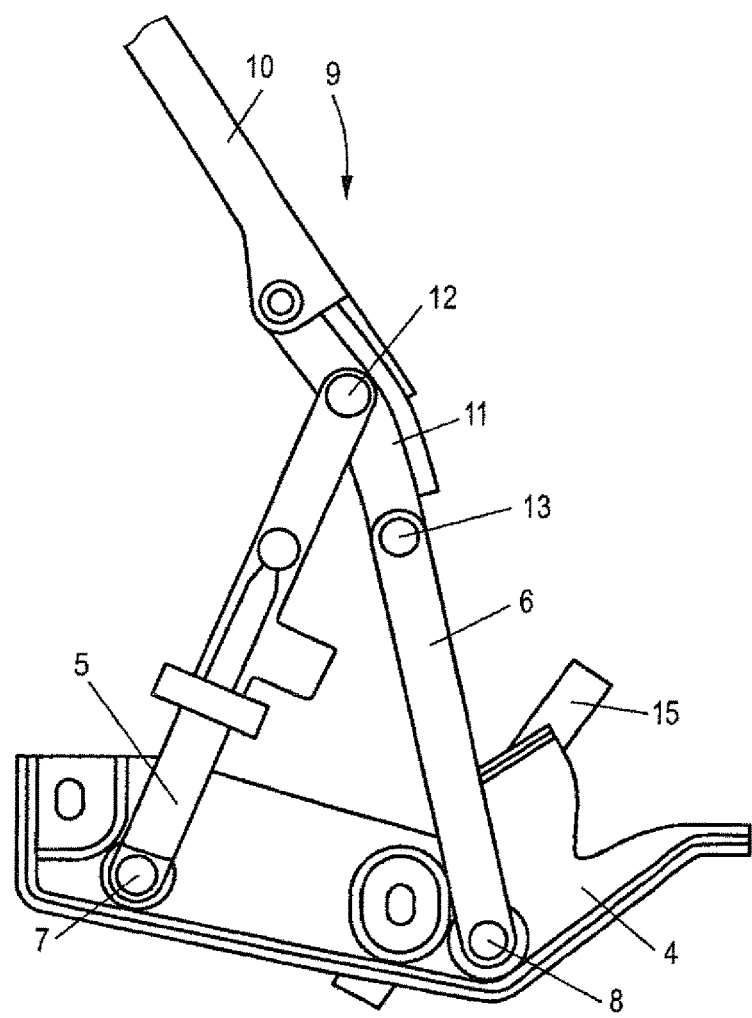

FIGS. 5 and 6 show the normal opening process, i.e. when the front gate 2 is swung open for service purposes. The actuator 15 is hereby not actuated in, i.e. the length of the first pivot strut 5 does not change based on FIG. 2. Also the two upper part portions 10 and 11 remain in their locked connection. When, starting from FIGS. 1 and 2, the front gate is swung open, the pivot struts 5, 6 pivot about their respective pivot bearings 7, 8 and 12, 13 and assume a triangular configuration relative to each other. The hinge upper part 9 remains in the initial configuration, i.e. the front gate 2 is swung open via the four-bar joint without actuation of the lifting mechanism. In correspondingly reverse manner, the closing movement is, of course, realized, i.e. there is a change between the hinge joint position of FIG. 6 to the hinge joint position of FIG. 2.

As is apparent from FIG. 6, the actuator 15 is not permanently coupled to the second upper part portion 11 in this configuration. Rather, it is ultimately fixed in position, the second upper part portion 11 distances itself from the actuator 15 during a normal opening movement. In the closed position, however, the upper part portion 11 is located directly in the effective area of the actuator 15, so that the latter acts directly on the upper part portion 11 upon ignition in order to effect the lifting operation according to FIGS. 3 and 4. This means the absence of a permanent connection, rather the position element can be coupled to the second upper part portion 11 only when activated.

The actuator 15 can involve a one-way linear actuator, which thus executes only a single push-out movement. Therefore, it is also readily possible to depress the raised front gate 2 from the raised position shown in FIG. 3 to the closed position shown in FIG. 1. In this case, the two upper part portions 10 and 11 are moved downwards and assume again the almost parallel basic position shown in FIG. 2. At the same time, the first pivot strut 5 is also collapsed again. As described, a renewed locking is not possible in the case of the bolt locking, but in the case of the described hook locking means.

What is claimed is:

1. A motor vehicle, comprising:
   a body;
   a front gate;
   two hinge joints swingably arranging the front gate to the body, each hinge joint including a body-side hinge lower part, a gate-side hinge upper part including a first gate-side upper part portion and a second upper part portion which is arranged on the first upper part portion for pivoting about a pivotal connection, first and second pivot struts swingably arranged on the hinge lower part and swingably arranged to the second upper part portion to thereby connect the hinge lower part and the hinge upper part to one another, said first pivot strut including a first strut portion arranged on the hinge lower part and a second strut portion arranged on the second upper part portion by a fixed pivotal connection and movable translatorily in relation to the first strut portion, and a locking member detachably securing the second upper part portion to the first upper part portion; and
   a controllable actuator configured for linkage to the second upper part portion and, when activated, causing the front gate to be raised from a closed position to a protective position as the locking member is released and the second upper part portion pivots about the pivotal connection relative to the first upper part portion, thereby translatorily moving the second strut portion relative to the first strut portion, and as the second upper part portion pivots about a pivotal connection relative to the second pivot strut.

2. The motor vehicle of claim 1, wherein the second strut portion is movable along a straight path or along a curved path relative to the first strut portion.

3. The motor vehicle of claim 1, wherein one of the first and second strut portions has an oblong hole for engagement of a guide pin provided on the other one of the first and second strut portions.

4. The motor vehicle of claim 3, wherein the oblong hole is formed with a constriction to define a latching receptacle in which the guide pin is received in the closed position of the front gate.

5. The motor vehicle of claim 1, wherein one of the first and second strut portions has lateral guide tabs configured to embrace the other one of the first and second strut portions.

6. The motor vehicle of claim 1, further comprising a holding device configured to secure the first pivot strut against pivoting relative to the hinge lower part after movement of the second strut portion.

7. The motor vehicle of claim 1, wherein the locking member is a locking hook which is automatically released when the actuator is activated.

8. The motor vehicle of claim 7, wherein the locking hook is arranged on the second upper part portion and engages behind a hook portion on the first upper part portion, said actuator configured for linkage with the locking hook to release the locking hook from a locked engagement, when the actuator is activated.

9. The motor vehicle of claim 8, wherein the locking hook swings out of the hook portion, when the actuator is activated.

10. The motor vehicle of claim 1, wherein the locking member is a bolt or rivet configured to shear off.

11. The motor vehicle of claim 1, wherein the actuator is arranged on a member selected from the group consisting of the body, the hinge lower part, and the first strut portion.

12. The motor vehicle of claim 1, wherein the actuator is a linear actuator.

13. The motor vehicle of claim 1, wherein the actuator is a pyrotechnic linear actuator.

14. The motor vehicle of claim 6, wherein the holding device comprises a lug-like or projection-like retaining portion which is provided on the second strut portion, and a retaining receptacle provided on the hinge lower part, with the retaining portion engaging behind or engaging in the retaining receptacle, when the front gate reaches the protective position.

* * * * *